June 4, 1940.　　J. A. STERHARDT　　2,203,396
CONTROL SURFACE LOCK
Filed Sept. 9, 1939
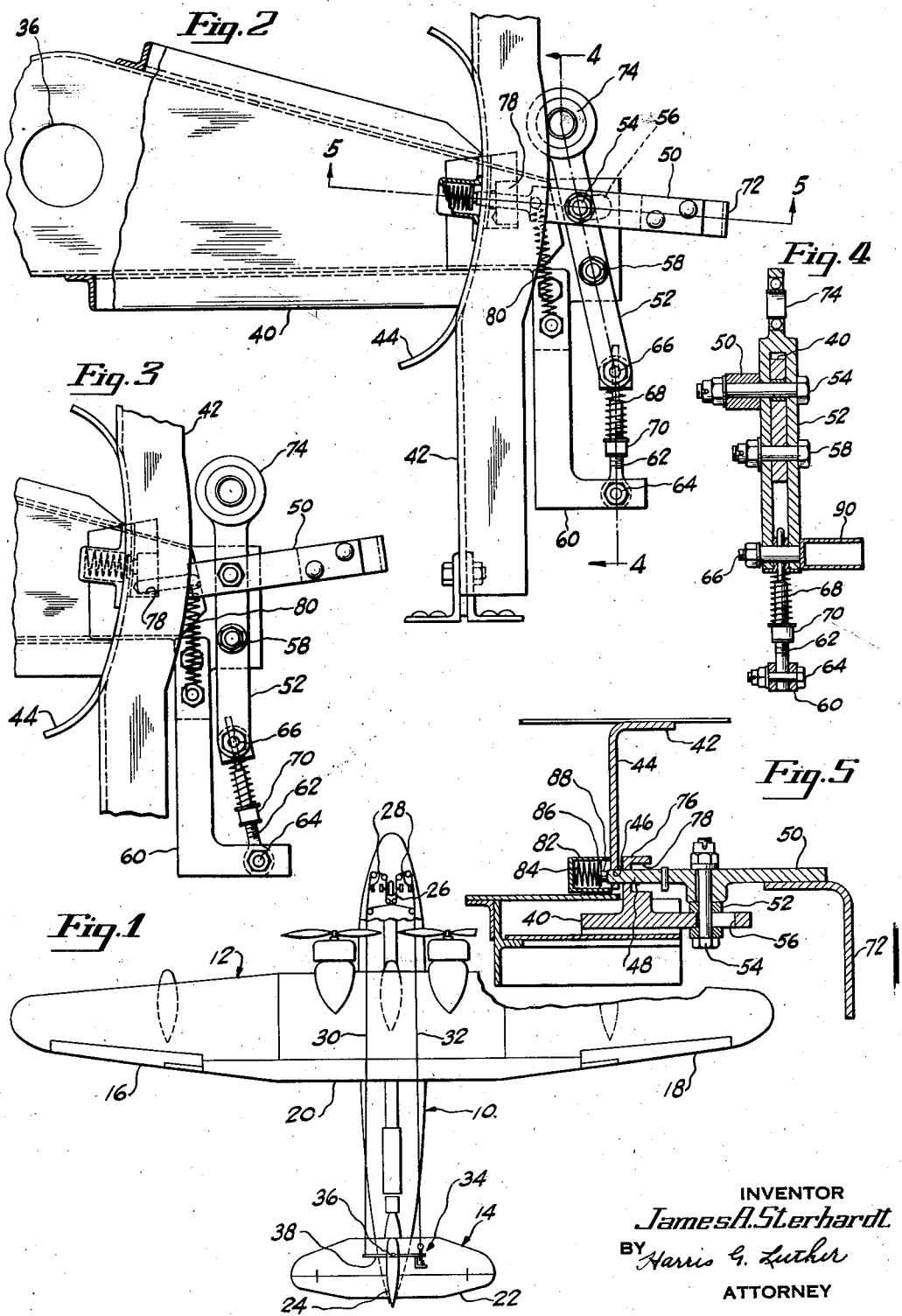
INVENTOR
James A. Sterhardt
BY Harris G. Luther
ATTORNEY Patented June 4, 1940

2,203,396

UNITED STATES PATENT OFFICE 2,203,396

CONTROL SURFACE LOCK

James A. Sterhardt, Towson, Md., assignor to United Aircraft Corporation, East Hartford, Conn., a corporation of Delaware Application September 9, 1939, Serial No. 294,176

12 Claims. (Cl. 244—1)

This invention relates to improvements in locking means for airplane control surfaces and has for an object the provision of an improved locking means which may be automatically released by actuation of the manual control for moving the control surface to which the lock is applied.

Other objects and advantages will be more particularly pointed out hereinafter or will become apparent as the description proceeds.

In the accompanying drawing, in which like reference numerals are used to designate similar parts throughout, there is illustrated a suitable mechanical arrangement for the purpose of disclosing the invention. The drawing, however, is for the purpose of illustration only and is not to be taken as limiting the invention since it will be apparent to those skilled in the art that various changes may be made in the illustrated arrangement without in any way exceeding the scope of the invention.

In the drawing,

Fig. 1 is a plan view of an airplane diagrammatically illustrating the application thereto of a lock device constructed according to the invention.

Fig. 2 is an elevational view of a portion of the airplane structure illustrating the application thereto of a lock constructed according to the invention.

Fig. 3 is a view of a fragmentary portion of Fig. 2 showing the lock in a different operating position from that illustrated in Fig. 2.

Fig. 4 is a sectional view on the line 4—4 of Fig. 2, and

Fig. 5 is a sectional view on the line 5—5 of Fig. 2.

Referring to the drawing in detail, Fig. 1 discloses an airplane having a fuselage, generally indicated at 10, a wing, generally indicated at 12, and a tail group or empenage, generally indicated at 14. The wing is provided with movable flight control surfaces, such as the ailerons 16 and 18, and the lift increasing flap 20, while the empenage includes movable control elements, such as the elevator 22 and rudder 24. For various reasons it may be desirable to lock any one or all of these movable control surfaces in fixed position while the airplane is on the ground. Particularly in the case of large airplanes it may be desirable to lock the elevator 22 in position so that its trailing edge will not drag on the ground when the airplane is moved, and it may be desirable to lock the rudder 24 against movement to assist in holding the airplane in a definite position against a relative wind and to prevent the rudder from being moved back and forth by the wind as the airplane is shifted about on the ground or on the water. While the improved locking arrangement may be applied to any of the movable surfaces above mentioned, it has been shown, for illustrative purposes, as applied to the rudder 24.

The flight control surfaces may be controlled by any suitable manually operable means, such as a hand wheel or control column 26, or by the foot pedals as indicated at 28. These manual control devices may be connected with some form of power operated device, if desired, to assist the manual effort in moving the control surface. Assuming that the rudder 24 is the surface to which the lock is applied and that the rudder is actuated by the control pedals 28 connected thereto by intermediate elements 30 and 32 which may be in the form of small links or cables, the arrangement is such that the rudder can be locked against movement, by the improved locking device generally indicated at 34, and may be released either by manually releasing the lock or by actuating the manual control, such as the pedals 28 to move the control surface.

The rudder is mounted upon a pivot 36 and provided with a yoke 38 comprising arms extending outwardly from each side of the rudder adjacent to the pivot 36 for connection to the ends of the cables 30 and 32. One of the arms of the yoke 38 is particularly indicated at 40 in Fig. 2, this being the arm to which the lock 34 is applied. A fixed lock bar 42 is secured to the structure of the airplane adjacent the outer end of the arm 40 substantially tangent to the arc traversed by the outer end of the arm at some position intermediate the length of the arc and is provided with a curved lock plate 44 formed integrally therewith or rigidly secured thereto, the lock plate having a curvature substantially the same as that of an arc centered on the center of the pivot 36. This curved lock plate 44 is provided intermediate its length with an aperture or detent 46 adapted to receive a locking tongue 48 provided on a latch bar 50 pivotally secured to the outer end of the arm 40 by means of an intervening pivoted lever 52. The latch bar 50 is pivotally secured to the lever 52 by suitable means such as the bolt 54 which passes through an elongated slot 56 in the outer end of the arm 40 while the lever 52 is pivotally connected to the outer end of the arm 40 by suitable means such as the bolt 58 spaced from the bolt 54 to provide for the latch bar 50 a longitudinal movement equal to the length of the slot 56 when the lever 52 is pivoted about the bolt 58. An L shaped bracket 60 is secured to the outer end of the arm 40 and projects beyond the end of the lever 52 adjacent the pivot bolt 58 to support one end of a pivoted toggle device comprising a shaft 62 pivoted at one end to the bracket 60 by a pivot bolt 64 and projecting at its other end through an aperture in a pivoted abutment 66 and carrying a coiled compression spring 68 which bears at one end against the abutment 66 and at the other end against an abutment 70 adjustable along the length of the shaft 62 by means of cooperating screw threads. This toggle mechanism is operated to resiliently maintain the lever 52 in the position illustrated in Fig. 2 in which the locking tongue 48 is engaged in the aperture 46. The latch bar 50 is provided at its end opposite the locking tongue 48 with a handle 72 for manually engaging the lock. The intermediate element 32 is connected to the end of the lever 52 opposite the toggle connected end by means of a suitable cable eye 74 and the pivot point 58 is so located with respect to the pivot point 64 when the latch bar 50 is in its locking position, that tension on the intermediate element 32 tends to straighten the lever 52 relative to the outer end of the arm 40 and move the latch bar 50 to disengage the locking tongue 48 from the aperture 46 to the position illustrated in Fig. 3 in which the toggle mechanism tends to resiliently maintain the locking tongue out of engagement with the aperture. The locking tongue 48 projects through an aperture in an upstanding lug 76 provided on the outer end of the arm 40 adjacent to the curved lock plate 44 so that, when the locking tongue projects through both the lug and the locking plate the arm will be rigidly held in fixed position. The lug 76 is provided in its side opposite the locking plate 44 with an elongated recess 78 which does not extend entirely through the lug and which has the greater portion of its length to one side of the aperture in the lug. A coil tension spring 80 connected at one end to the bracket 60 and at its opposite end to the latch bar 50 acts to resiliently pull the end of the locking tongue of the latch bar towards the end of the recess 78 away from the aperture. A small cylindrical housing 82 is secured to the locking plate 44 over the aperture 46 on the side of the locking plate opposite the lug 76 and contains a compression spring 84 which bears at one end against the closed outer end of the housing and at its opposite end against an abutment 86 which is provided with a plunger 88 adapted to fill the locking aperture in the locking plate 44.

The operation of the improved locking device is substantially as follows:

When the airplane has been brought to rest on the ground and it is desired to lock the particular movable control surface against movements an attendant may grasp the handle 72 and force the latch bar inwardly toward locking position, at the same time pulling the handle in a direction to move the locking tongue from the end of the recess 78 in which it is resiliently maintained by the spring 80 to a position in which it is in alignment with the aperture through the lug 76. If the aperture in the lug 76 does not happen at that time to be in alignment with the aperture 46 in the locking plate 44 the end of the locking tongue will come into contact with the side of the locking plate and its further movement will be arrested. Pressure is then maintained on the latch bar 50 to urge the end of the locking tongue against the side of the locking plate and the latch is also moved in a direction to swing the arm 40 a slight amount about its pivot 36 to move the end of the locking tongue along the side of the plate until the end of the tongue comes into alignment with the aperture 46. In the case of large airplanes it may be desirable to move the control surface a slight amount in opposite directions near its locking position while maintaining pressure on the latch bar 50 to bring the end of the latch bar into alignment with the aperture in the locking plate. As soon as the latch bar is brought into alignment with the locking plate aperture the pressure maintained thereon will force the plug 88 out of the aperture against the force exerted by the spring 84 and will at the same time move the toggle mechanism connected to the end of the lever 52 past its dead center to hold the lever 52 in position to maintain the locking tongue in the locking plate aperture, there being sufficient slack or lost motion in the intermediate members 30 and 32 to permit the force of the spring 68 to maintain the lever 52 in the locking position, as particularly illustrated in Fig. 2.

If the lock 34 is within the covering of the airplane, as will usually be the case, it may be reached from the interior of the airplane in case the airplane is of large size or a removable cover portion may be provided to permit access to the handle 72. In some installations it may be more convenient to operate the lock from some other point such, for example, as the toggle end of the lever 52, in which case the bolt 66 may be provided with a modified head as indicated at 90 in Fig. 4 to serve as a handle for operating the latch.

When it is desired to free the control surface an attendant may grasp the handle 72 and pull the latch bar 50 outwardly until the pivot bolt 54 is moved to the outer end of the slot 56, in which position the locking tongue 48 will be moved out of the aperture 46 and through the aperture in the lug 76. The plug 88 will then be moved by the spring 84 to fill the aperture 46 and, upon release of the handle 72 the spring 80 will pull the end of the latch bar 50 to bring the end of the locking tongue into the end of the recess 78 away from the aperture in the lug to safety the lock against accidental engagement. At the same time the lever 52 will be moved to the position shown in Fig. 3 in which it is in substantial alignment with the intermediate connecting element 32.

If this above described unlocking of the flight control member should be neglected before the airplane takes off the pilot will encounter resistance when he attempts to move the control surface by the corresponding manual control element. The arrangement is such, however. that a reasonable application of force to the manual control element will exert a force through the intermediate element 32 to rotate the lever 52 about the pivot 58 from the locking position shown in Fig. 2 to the free position shown in Fig. 3. This movement of the lever 52 withdraws the locking tongue 48 from its engagement in the aperture 46 into the recess 78 in which it may then be safetyed by the action of the spring 80. When the lever 52 is rotated by the pull of the element 32 the toggle between the end of this lever and the bracket 60 will be moved past its dead center and will assist in moving the latching bar a sufficient distance to bring the end of the locking tongue entirely within the recess 78 and will also assist in maintaining the latch bar in position with the bolt 54 at the outer end of the slot 56 until the lock is manually reengaged after the airplane has been brought to rest on the ground.

There has thus been provided a simple and effective control surface lock which may be engaged by an attendant from either the inside or outside of the airplane but only by intentional action, and which may be released either by the intentional action of an attendant before the airplane takes off or, if this should be overlooked, by the pilot while the airplane is in flight by simply applying a predetermined force in one direction to the manual control element which moves the particular flight control device. Thus, if upon taking off, the pilot should desire to move the flight control device in one direction and should find that the device was still locked and immovable he could release the device either by applying an increased force in the same direction or reversing the application of the force. Thus, if he were trying to move the rudder 24 to the left as viewed in Fig. 1, by exerting a force on the element 30 and found the rudder to be locked, by temporarily applying the force to the element 32 to move the rudder to the right, the rudder would be unlocked and could then be moved to the left as at first intended while, if the initial effort were to move the rudder to the right and it was found to be locked, it would be merely necessary to increase the force applied to move the rudder in the same direction.

While a particular mechanical arrangement has been illustrated in the accompanying drawing and hereinabove described for the purpose of disclosing the invention, it is to be understood that the invention is not limited to the particular arrangement so illustrated and described, but that such changes in the size, shape and arrangements of the various parts may be resorted to as come within the scope of the sub-joined claims.

Having now described the invention so that others skilled in the art may clearly understand the same, what it is desired to secure by Letters Patent is as follows:

1. In an aircraft having a movable flight control member and manually actuated means for moving said flight control member, a locking for fixing said flight control member in a predetermined position, manually operable means for engaging and releasing said lock, and means operable by said member moving means for releasing said lock.

2. In an aircraft having a movable flight control member and manually actuatable means for moving said flight control member, a lock for fixing said flight control member in a predetermined position, manually operable means for engaging and releasing said lock, means operable by said member moving means for releasing said lock, and means for safetying said lock in its inoperative condition against accidental engagement.

3. In an aircraft having a movable flight control member and manually actuatable means for moving said flight control member, a lock for fixing said flight control member in a predetermined position comprising, a fixed member having one lock element, another lock element carried by said flight control member engageable with said one lock element, means for resiliently maintaining said another lock element in either its locking or its inoperative position, means for manually moving said another lock element from one to the other of its two positions, and means operatively connecting said another lock element with said flight control member moving means to move said another lock element from its locking position to its inoperative position whenever force is applied to said member moving means.

4. In an aircraft having a movable flight control member and manually actuatable means for moving said flight control member, a lock for fixing said flight control member in a predetermined position comprising, a fixed member having an aperture, a pivoted lever bodily movable with said flight control member, a latch bar pivotally connected to said lever and carried thereby so that movements of said lever about its pivot carry said latch bar between its locking position and its inoperative position, manually operable means for moving said latch bar from one of said positions to the other, and means operatively connecting said lever with said flight control member moving means to move said latch bar from its locking position to its inoperative position when a predetermined force is applied to said member moving means.

5. In an aircraft having a flight control surface movable about a hinge connection, an arm projecting outwardly from said surface to move the same, and manually actuatable means operatively connected with said arm for moving said flight control surface, a lock for fixing said flight control surface in a predetermined position comprising, a fixed member having an aperture, a pivoted lever carried by said arm near its outer end, a latch bar pivotally connected to said lever and carried thereby so that movements of said lever about its pivot carry said latch bar between its locking position and its inoperative position, manually operable means for moving said latch bar from one of said positions to the other, the connection between said manually actuated surface moving means and said arm including said pivoted lever, whereby force applied to said manually actuated surface moving means will swing said lever about its pivot to move said latch bar to its inoperative position.

6. In an aircraft having a hinged flight control surface provided with an outwardly projecting arm, manually actuatable means for moving said control surface, and an intermediate element operatively connecting said manually actuatable means with the outer end of said arm, means for locking said surface in a predetermined position comprising, a fixed member secured to said aircraft adjacent to said arm having a latch element therein, a lever pivoted to said arm and connected at one end to said intermediate connecting element, another latch element pivotally carried by said lever and movable between a locking and an inoperative position, means operatively associated with said lever for limiting the movements of said another latch element, and a handle for moving said another latch element between a position in which it engages said detent and a position in which it is entirely clear of said member.

7. In an aircraft having a hinged flight control surface provided with an outwardly projecting arm, manually actuatable means for moving said control surface, and an intermediate element operatively connecting said manually actuatable means with the outer end of said arm, means for locking said surface in a predetermined position comprising, a fixed member having a fixed latch element therein secured to said aircraft adjacent to said arm, a lever pivoted to said arm and connected at one end to said intermediate connecting element, a movable latch element pivotally carried by said lever and movable between a locking and an inoperative position, means operatively associated with said lever for limiting the movements of said movable latch element, and a handle for moving said movable latch element between a locking position in which it engages said fixed latch element and a position in which it is entirely clear of said member, the pivot of said lever being out of line with the force exerted by said intermediate connecting member when said latch bar is in its locking position whereby force applied through said intermediate member will swing said lever to move said movable latch element from its locking position.

8. In an aircraft having a hinged flight control surface provided with an outwardly projecting arm, manually actuatable means for moving said control surface, and an intermediate element operatively connecting said manually actuatable means with the outer end of said arm, releasable means for locking said surface in a predetermined position comprising, a fixed member having a latch detent therein secured to said aircraft adjacent to said arm, a lever pivoted to said arm and connected at one end to said intermediate connecting element, a latch bar pivotally carried by said lever and movable between a locking and an inoperative position, means operatively associated with said lever for limiting the movements of said latch bar, a handle for moving said latch bar, and a spring actuated toggle mechanism operatively associated with said lever for resiliently maintaining said latch bar in either one of said positions.

9. In an aircraft having a hinged flight control surface provided with an outwardly projecting arm, manually actuatable means for moving said control surface, and an intermediate element operatively connecting said manually actuatable means with the outer end of said arm, releasable means for locking said surface in a predetermined position comprising, a fixed member having a latch detent therein secured to said aircraft adjacent to said arm, a lever pivoted to said arm and connected at one end to said intermediate connecting element, a latch bar pivotally carried by said lever and movable between a locking position in which it engages in said detent and an inoperative position in which it is entirely clear of said fixed member, and a lug on said arm movable along one side of said fixed member having an aperture therein for the passage therethrough of the reduced end portion of said latch bar whereby said latch bar when engaging in said detent firmly positions said arm with respect to said fixed member.

10. In an aircraft having a hinged flight control surface provided with an outwardly projecting arm, manually actuatable means for moving said control surface, and an intermediate element operatively connecting said manually actuatable means with the outer end of said arm, releasable means for locking said surface in a predetermined position comprising, a fixed member having a latch detent therein secured to said aircraft adjacent to said arm, a lever pivoted to said arm and connected at one end to said intermediate connecting element, a latch bar pivotally carried by said lever and movable between a locking position in which it engages in said detent and an inoperative position in which it is entirely clear of said fixed member, a lug on said arm movable along one side of said fixed member having an aperture for the passage therethrough of the reduced end of said latch bar and a well at one side of said aperture connected therewith, and a spring carried by said lever and connected to said latch bar to resiliently urge the reduced end of said latch bar into said well to safety said lock against accidental engagement.

11. In an aircraft having a hinged flight control surface provided with an outwardly projecting arm, manually actuatable means for moving said control surface, and an intermediate element operatively connecting said manually actuatable means with the outer end of said arm, releasable means for locking said surface in a predetermined position comprising, a fixed member having a latch detent therein secured to said aircraft adjacent to said arm, a lever pivoted to said arm and connected at one end to said intermediate connecting element, a latch bar pivotally carried by said lever and movable between a locking position in which it engages in said detent and an inoperative position in which it is entirely clear of said fixed member, the pivot point of said lever being out of line with the force exerted by said intermediate connecting member when said latch bar is in its locking position so that force exerted through said intermediate member will move said latch bar out of engagement with said detent, and a handle on said latch bar for moving said latch bar between its locking and its inoperative positions.

12. In an aircraft having a hinged flight control surface provided with an outwardly projecting arm, manually actuatable means for moving said control surface, and an intermediate element operatively connecting said manually actuatable means with the outer end of said arm, releasable means for locking said surface in a predetermined position comprising, a fixed member having a latch detent therein secured to said aircraft adjacent to said arm, a lever pivoted to said arm and connected at one end to said intermediate connecting element, a latch bar pivotally carried by said lever and movable between a locking position in which it engages in said detent and an inoperative position in which it is entirely free of said fixed member, the pivot point of said lever being out of line with the force exerted through said intermediate connecting member when said latch bar is in its locking position so that force exerted through said intermediate member will move said latch bar out of engagement with said detent, and a handle on said lever for moving said latch bar between its locking and its inoperative positions.

JAMES A. STERHARDT.